US012759458B2

(12) United States Patent
Yong et al.

(10) Patent No.: US 12,759,458 B2
(45) Date of Patent: Oct. 13, 2026

(54) PEDESTRIAN ALERT SYSTEM

(71) Applicant: GM Global Technology Operations LLC, Detroit, MI (US)

(72) Inventors: Seokju Yong, Bucheon-si (KR); Sungdae Kim, Bucheon-si (KR); Yeongman Jo, Seoul (KR); Gaurav Talwar, Novi, MI (US); Bongbum Back, Incheon (KR); Jenna Hansen, Sterling Heights, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 20 days.

(21) Appl. No.: 18/895,495

(22) Filed: Sep. 25, 2024

(65) Prior Publication Data

US 2026/0084615 A1 Mar. 26, 2026

(51) Int. Cl.
*B60Q 9/00* (2006.01)
*G01S 13/931* (2020.01)
(Continued)

(52) U.S. Cl.
CPC ............ *B60Q 9/008* (2013.01); *G01S 13/931* (2013.01); *G01S 17/931* (2020.01); *G06V 20/58* (2022.01); *G06V 40/10* (2022.01)

(58) Field of Classification Search
CPC ..... B60Q 9/008; G01S 13/931; G01S 17/931; G06V 20/58; G06V 40/10
See application file for complete search history.

(56) References Cited

U.S. PATENT DOCUMENTS 11,541,902 B2 * 1/2023 Elkins .................... G08G 1/167
2018/0290590 A1 10/2018 Goldman-Shenhar et al.
(Continued)

FOREIGN PATENT DOCUMENTS

DE 102011105787 A1 12/2012
DE 102019006492 A1 3/2020
(Continued)

OTHER PUBLICATIONS

German Office Action for German Application No. 102024133241.7; dated May 26, 2025; 4 pages.

*Primary Examiner* — Jason Holloway
*Assistant Examiner* — Madison B Emmett
(74) *Attorney, Agent, or Firm* — CANTOR COLBURN LLP

(57) ABSTRACT

A system for alerting pedestrians to a vehicle includes a sensing system having at least one imaging sensor in communication with a controller. The controller includes a processor and a memory. The memory stores a pedestrian detection module and a pedestrian alert module. The pedestrian detection module including instructions configured to cause the processor to identify a pedestrian in an output of the at least one imaging sensor using image analysis and instructions configured to cause the processor to respond to an identified pedestrian by determining a reduced sensory state of the pedestrian. The system generates an ambient environment model based on an output of the at least one imaging sensor and a connection to at least one external data source. The pedestrian alert module causes the processor to generate a pedestrian alert that contrasts with the ambient environment model. An external alert system implements the pedestrian alert.

20 Claims, 8 Drawing Sheets

(51) Int. Cl.

| | |
|---|---|
| ***G01S 17/931*** | (2020.01) |
| ***G06V 20/58*** | (2022.01) |
| ***G06V 40/10*** | (2022.01) |

(56) References Cited

U.S. PATENT DOCUMENTS

| | | | | |
|---|---|---|---|---|
| 2019/0057606 | A1 | 2/2019 | Skvarce | |
| 2020/0271823 | A1 * | 8/2020 | Herman | G01S 7/497 |
| 2023/0121146 | A1 * | 4/2023 | Yamamoto | G06T 7/11<br>340/944 |
| 2024/0351402 | A1 * | 10/2024 | Nagata | B60R 16/037 |

FOREIGN PATENT DOCUMENTS

| | | | |
|---|---|---|---|
| DE | 102020200274 | A1 | 7/2021 |
| DE | 102020203942 | A1 | 9/2021 |
| DE | 102020204044 | A1 | 9/2021 |
| DE | 102024114248 | A1 | 8/2024 |

* cited by examiner

PEDESTRIAN ALERT SYSTEM

INTRODUCTION

The subject disclosure relates to vehicles, and in particular vehicle systems for alerting unaware and sensory impaired pedestrians to the presence of a vehicle.

Internal combustion engine (ICE) vehicles include numerous distinct sensory outputs inherent to the operation of an ICE and that alert pedestrians to the presence of the ICE vehicle. Included among the sensory outputs are engine sounds resulting from operation of an ICE as well as the accompanying olfactory impact of exhaust fumes from the ICE.

Due to the manner in which they operate electric vehicles (EVs) do not inherently include at least some of the sensory outputs. As a result, operation of EVs can exacerbate pedestrian inattentiveness or disability based lack of awareness of the EV.

Further, regardless of whether the vehicle is an ICE vehicle, an EV, or a hybrid ICE/EV, environmental factors such as intense sunlight, strong smells and loud environments can obscure existing sensory outputs. This again exacerbates any pedestrian inattentiveness or disability based lack of awareness of the vehicle.

Accordingly, it is desirable to provide a system and process for alerting pedestrians to a presence of a vehicle.

SUMMARY

In one exemplary embodiment a system for alerting pedestrians to a presence of a vehicle includes a sensing system having at least one imaging sensor in communication with a controller. The controller includes a processor and a memory. The memory stores a pedestrian detection module and a pedestrian alert module. The pedestrian detection module including instructions configured to cause the processor to identify a pedestrian in an output of the at least one imaging sensor using image analysis and instructions configured to cause the processor to respond to an identified pedestrian by determining a reduced sensory state of the pedestrian. The system generates an ambient environment model based on an output of the at least one imaging sensor and a connection to at least one external data source. The pedestrian alert module determines at least one alert type, based on the reduced sensory status of the pedestrian and at least one of the initial visual data and the initial audio data. The alert type includes one of an audio alert, a visual alert, an olfactory alert, and a tactile air impact alert. The pedestrian alert module causes the processor to generate a pedestrian alert of the at least one alert type and the pedestrian alert contrasts with the ambient environment model. An external alert system implements the pedestrian alert external to the vehicle. The external alert system including at least one of an audio alert system, a visual alert system, an olfactory alert system, and a tactile air alert system.

In addition to one or more of the features described herein the external alert system includes the audio alert system and the visual alert system, the visual alert system includes a projector, the audio alert system includes a speaker, and wherein causing the alert system to implement the pedestrian alert includes activating at least one of the audio alert system and the visual alert system.

In addition to one or more of the features described herein the audio alert system has an audio output that is adjustable in at least amplitude and frequency.

In addition to one or more of the features described herein the visual alert system has a visual output that is adjustable in at least color and brightness.

In addition to one or more of the features described herein the external alert system includes the olfactory alert system, the olfactory alert system includes a blower, and the blower has an olfactory output that is adjustable in at least scent.

In addition to one or more of the features described herein the external alert system includes the tactile air alert system and the tactile air alert system includes an airflow generator.

In addition to one or more of the features described herein determining the reduced sensory state of the pedestrian includes identifying one of a distracted state of the pedestrian and a detectable disability of the pedestrian and wherein the at least one alert type includes an audio alert in response to the pedestrian having a distracted state.

In addition to one or more of the features described herein determining the reduced sensory state of the pedestrian includes identifying one of a distracted state of the pedestrian and a detectable disability of the pedestrian and wherein the at least one alert type includes a visual alert in response to identifying a hearing impairment of the pedestrian.

In addition to one or more of the features described herein determining the reduced sensory state of the pedestrian includes identifying one of a distracted state of the pedestrian and a detectable disability of the pedestrian and wherein the at least one alert type includes an audio alert in response to identifying a vision impairment of the pedestrian.

In addition to one or more of the features described herein determining the reduced sensory state of the pedestrian includes identifying one of a distracted state of the pedestrian and a detectable disability of the pedestrian includes identifying a detectable disability having an impairment above a minimum threshold and wherein the at least one alert type omits a corresponding one of the audio alert, visual alert, olfactory alert, and the tactile air impact alert.

In addition to one or more of the features described herein the sensing system includes at least one ranging sensor and the at least one ranging sensor including at least one of a light and distance ranging (LiDAR) sensor and a radio and distance ranging (RADAR) sensor, and generating the pedestrian alert is based at least in part on a range output received by the processor from the at least one ranging sensor.

In addition to one or more of the features described herein generating the pedestrian alert of the determined at least one alert type comprises providing the ambient environment model and a set of reward/weight penalties to a weighted machine learning algorithm.

In addition to one or more of the features described herein the set of reward/weight penalties are received from a remote computing system.

In addition to one or more of the features described herein the pedestrian alert module is further configured to cause the processor to isolate a response of the pedestrian to the pedestrian alert and provide the response of the pedestrian to the remote computing system.

In addition to one or more of the features described herein generating the pedestrian alert of the at least one alert type comprises applying the ambient environment model to a rules-based alert model.

In addition to one or more of the features described herein the olfactory blower includes a scent repository and a compressed gas portion, the scent repository storing at least one aromatic chemical.

In addition to one or more of the features described herein the scent repository stores a plurality of distinct aromatic chemicals, and wherein generating a pedestrian alert of the at least one alert type includes selecting one of a distinct aromatic chemical from the plurality of distinct aromatic chemicals and a combination of distinct aromatic chemicals from the plurality of distinct aromatic chemicals, and implementing the pedestrian alert comprises dispersing the selected one of the distinct aromatic chemical from the plurality of distinct aromatic chemicals and the combination of distinct aromatic chemicals from the plurality of distinct aromatic chemicals using compressed gas from the compressed gas portion.

In addition to one or more of the features described herein the ambient environment model includes a time of day, a weather state, an ambient sound profile, an ambient lighting profile, a speed of the vehicle, and a direction of travel of the vehicle.

In another exemplary embodiment a method for alerting a pedestrian to the presence of a vehicle. The method includes receiving a set of images from a vehicle sensor system at a controller and identifying a pedestrian in the set of images using image analysis performed by the controller, determining a reduced sensory state of the pedestrian using the controller, receiving, at the controller, a set of ambient conditions from the vehicle sensor system and generating an ambient environment model, determining at least one alert type corresponding to the reduced sensory state, wherein the at least one alert type includes at least one of an audio alert, a visual alert, an olfactory alert, and a tactile air impact alert, generating a pedestrian alert based on the at least one alert type and an ambient environment model using a pedestrian alert module, wherein the pedestrian alert contrasts an ambient environment defined by the ambient environment model, and implementing the pedestrian alert using at least one external alerting system of the vehicle.

In addition to one or more of the features described herein the pedestrian alert module is a weighted machine learning algorithm, and wherein a set of rewards/weight penalties for the weighted machine learning algorithm is retrieved from a remote computing system.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
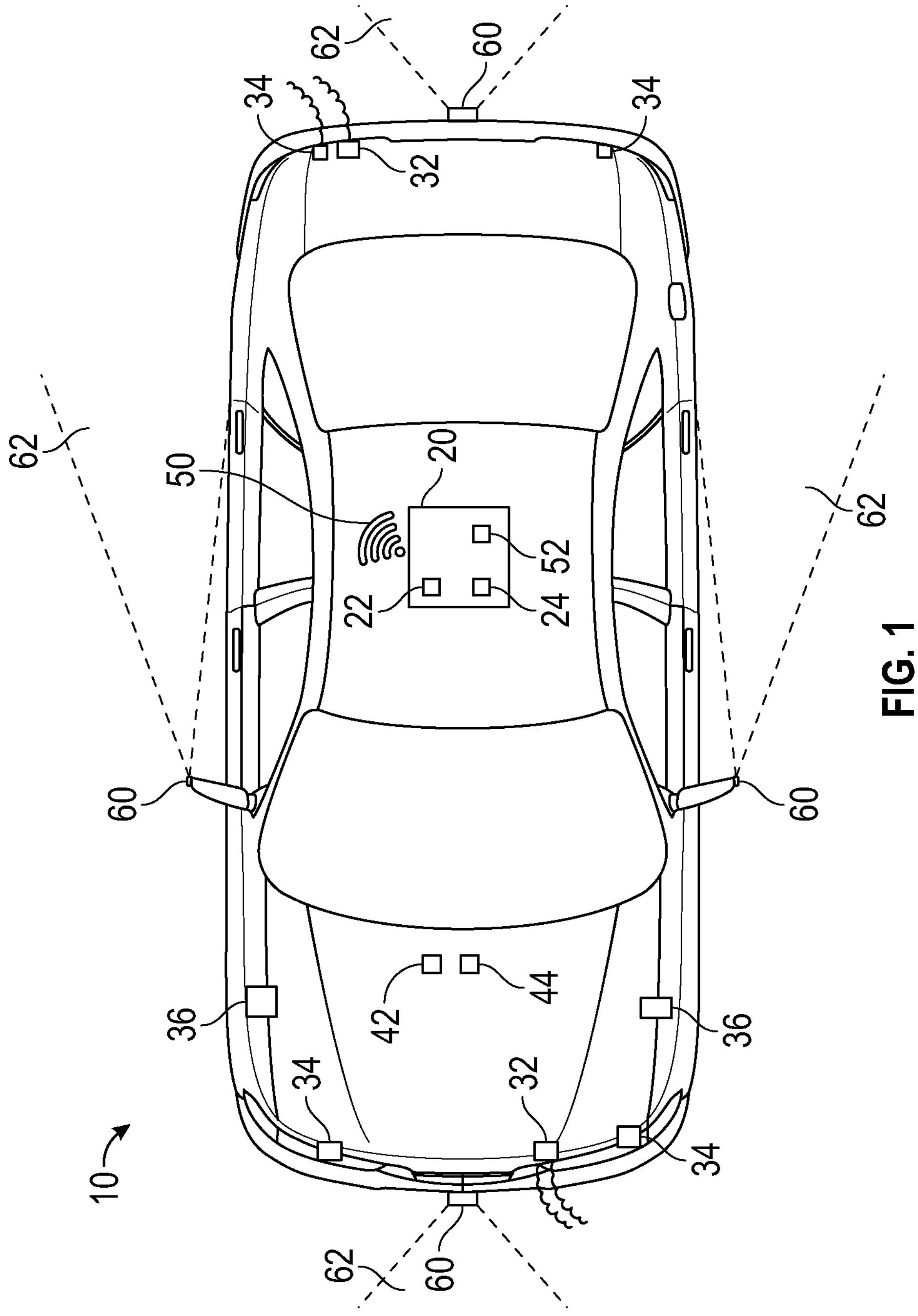
FIG. 1 is a schematic representation of a vehicle including systems for alerting a pedestrian of the presence of the vehicle.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory (e.g., random access memory, solid state data storage, disc drives, or any other computer-readable non-transitory data storage medium) that executes one or more software or firmware programs, a combinational logic circuit, and/or other suitable components that provide the described functionality.

As used herein the term controller can refer to a singular dedicated controller including a memory and a processor configured to implement a control scheme, a grouping of processors and memory in communication with each other and configured to operate cooperatively to implement a control scheme, a remote processing structure such as a cloud computing system configured to implement a control scheme and any similarly situated processor and memory configuration for implementing a particular control scheme.

As used herein the term generative artificial intelligence (AI) refers to artificial computer models able to generate original content including text, images, audio, code, and the like in response to a provided prompt. Generative AI models use weighted machine learning to correlate sets of received input data with a desired output. Generative AI utilizes a training data set to learn the correlations using transformer neural networks, and the training data set is typically comprised of a substantially large dataset. As used in the instant example, the weighted machine learning uses a based machine learning model to correlate received environment parameters with a desired contrasting alert type. Weights, in the form of rewards and penalties are applied to each received parameter, and determine how much impact that parameter has on the determined contrasting output.

As used herein a reduced sensory state is a condition where a person's ability to perceive a vehicle using one or more sense is reduced relative to an average person. The reduced sensory state may be the result of inattentiveness due to distraction, physical disability, material obstruction (e.g. headphones), or any similar factor.

In one general example, a vehicle includes a pedestrian detection system able to identify pedestrians having a level of inattentiveness to their environment resulting from either unawareness or from a disability. The vehicle further includes multiple systems and structures configured to alert identified pedestrians to the presence of the vehicle through audio alerts, visual alerts, and olfactory alerts.

With reference to the general example, FIG. 1 illustrates a vehicle 10 including a controller 20 configured to identify pedestrians using a pedestrian detection module 22 and to determine when the pedestrians are inattentive. Communication signals to and from the controller 20 can be wireless or wired using any conventional communication system and illustration of the communication signal connections is omitted in the interest of visual clarity of FIG. 1.

The controller 20 further includes a pedestrian alert module 24 configured to activate at least one of a blower 32, a projector 34 (e.g. a light and/or image projector), and a speaker 36 (referred to collectively as external alerting systems 32, 34, 36). As used herein, the projector 34 and all accompanying components for operating the projector 34 are referred to as a visual alert system, the blower 32 and all accompanying components for effecting an olfactory alert are referred to as an olfactory alert system, the blower 32 and all accompanying components for effecting a tactile air alert are referred to as a tactile air alert system, and the speaker 36 and all accompanying components for effecting an audio alert are referred to as an audio alert system.

Each speaker 36 is able to output an adjustable amplitude and frequency. Similarly, each projector 34 is able to project an adjustable color and brightness, including projecting multiple colors simultaneously, and each olfactory blower is able to disperse multiple distinct chemicals or combinations of chemicals at varying pressures.

Multiple blowers 32, projectors 34 and speakers 36 are distributed about the vehicle 10 with each blower 32, projector 34 and speaker 36 being controllably coupled to the controller 20. In some examples, the external alerting systems 32, 34, 36 can be directional with each instance of a given external alerting system 32, 34, 36 being able to direct a corresponding output type toward a specific zone adjacent to the vehicle 10.

In addition to the external alerting systems 32, 34, 36, the vehicle 10 includes at least one audio sensor 42, such as a microphone, in communication with the controller 20 and at least one light sensor 44 in communication with the controller 20. The audio sensor 42 and the light sensor 44 are each configured to sense ambient conditions exterior to the vehicle 10 and provide the sensed condition profiles to the controller 20. The combination of sensors providing information about the exterior environment to the controller 20 is collectively referred to as a vehicle sensor system or a sensing system. In some examples, the vehicle sensor system may also include sensors for detecting vehicle features and internal aspects of the vehicle 10 as well as an external environment.

The vehicle 10 can include a global navigation satellite system (GNSS) 52 and a wireless connection 50 connecting the controller 20 to remote networked information repositories either directly or indirectly through cloud computing networks. In one example, the GNSS 52 uses a Global Positioning System (GPS) architecture. In alternative examples any alternative GNSS architecture may be used to the same effect. The wireless connection 50 allows the controller 20 to poll a wide information network such as the internet and/or a set of specific remote databases for current state information about a location of the vehicle 10.

A set of imaging devices 60 are disposed about the vehicle 10. In one example, the imaging devices 60 include video cameras. Each imaging device 60 defines a corresponding field of view 62 and provides generated images to the controller 20. In some examples, the imaging devices 60 can further be packaged with one or more ranging sensor such as a light and distance ranging (LiDAR) sensor and/or a radio and distance ranging (RADAR) sensor.

The controller 20 applies object and pedestrian recognition processes of the pedestrian detection module 22 to the outputs of the imaging devices 60 and identifies pedestrians external to the vehicle 10 as well as the positioning of the pedestrian relative to the vehicle 10. The pedestrian detection module 22 operates using any known object and/or pedestrian detection processes. When the imaging devices 60 are packaged with ranging sensors, or when the vehicle 10 includes ranging sensors placed elsewhere on the vehicle 10, the output of the ranging sensors can be used to further enhance the detection of relative positioning of detected pedestrians and the vehicle 10. In other examples, the controller 20 may include software able to determine distances between the vehicle 10 and pedestrians using only image analysis on the output of the imaging devices 60.

Figure 2:
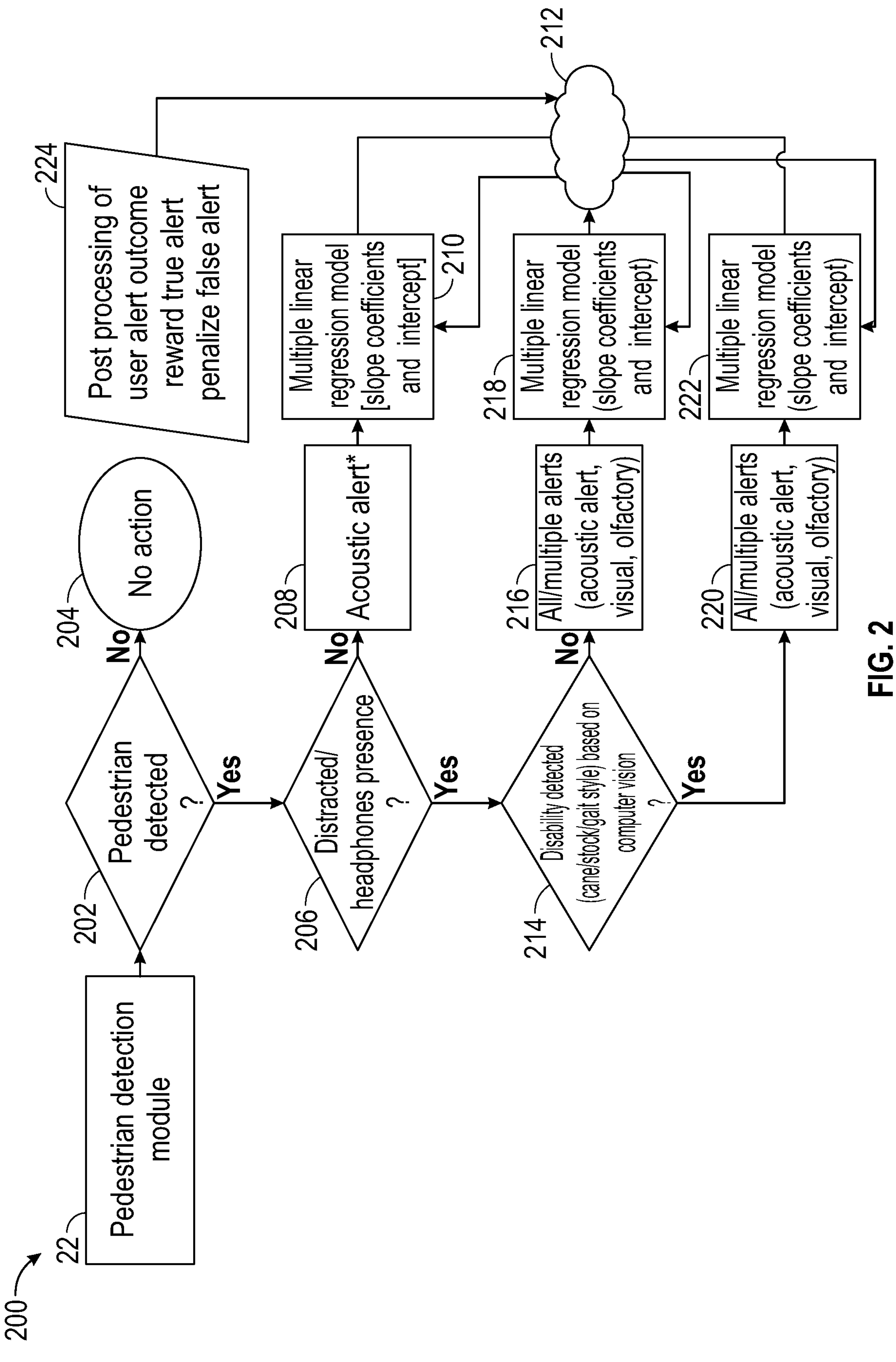
FIG. 2 illustrates a process for alerting pedestrians of a vehicle presence including auditory, visual, and olfactory alerts.

With continued reference to FIG. 1, FIG. 2 illustrates a process 200 operated by the pedestrian alert module 24 based on an output from the pedestrian detection module 22 according to one example. The process 200 begins with a pedestrian detected check 202 on an output of the pedestrian detection module 22. When no pedestrian is detected in the vicinity of the vehicle 10, the pedestrian alert process 200 takes no action in a take no action stop 204.

When a pedestrian is detected, the pedestrian alert process 200 proceeds to determine if the pedestrian is distracted or otherwise inattentive in a distracted/headphones presence check 206. The check 206 is performed using image analysis of the pedestrian to identify when the pedestrian is distracted and/or sounds are otherwise obscured. By way of example, the check 206 can use image analysis to determine the pedestrian is not facing the vehicle, is wearing earphones or other ear coverings, and/or using a smart device or other technology that may distract the pedestrian. The image analysis is performed on images generated by the imaging devices 60. In some alternative examples, where the vehicle 10 is Vehicle to Vehicle (V2V) or Vehicle to Other (V2X) enabled, the image analysis may include images of the pedestrian generated by imaging sensors exterior to the vehicle 10 and in communication with the vehicle 10. By way of example, the imaging sensors can include still image cameras, video cameras, or any similar sensor able to capture an image.

When the check 206 determines that the pedestrian is not distracted and does not have their hearing obscured, the process 200 initiates an audio alert 208. The audio alert 208, in one example, uses multiple linear regression models such as slope coefficients and intercepts to model the ambient noises around the vehicle 10 and vehicle noises from the vehicle 10 received from the audio sensor 42. In addition, reward/penalty weights for the linear regression modes are received from a remote computer system 212. The rewards/penalty weights provided by the remote computer system 212 are generated based on previously confirmed successful audio alerts, and iterated on and improved upon by the remote computer system 212 using a post processing system 224 as more successful audio alerts are provided to the remote computer system 212.

The modeled ambient noises and vehicle noises and the reward/penalty weights are used to generate an alert sound that contrasts with the ambient noises and vehicle noises and thus is more noticeable to the pedestrian in a generate audio alert step 210. The audio alert is played through the speaker(s) 36 at a volume configured to exceed an ambient noise volume. In one example, the contrasting audio is generated using a generative AI model. In another example, the contrasting audio is generated using rules based generation models or statistical based models. The generated audio alert and image(s) of the pedestrians response are provided back to the remote computer system 212 where the response is stored and used to improve future rewards/penalty weights.

In examples where directional speakers 36, or multiple speakers 36 are included on the vehicle 10, the controller 20 can cause only the speaker(s) 36 directed toward the pedestrian to emit the audio alert, thereby providing a more targeted alert.

When the check 206 determines that the pedestrian is distracted, the process 200 determines if a detectable disability is present in a detect disability check 214, when no disability is detected at the check 206, the process 200 generates multiple alerts in a multiple alert step 216. As used herein a detectable disability includes any disability including visual identifiers that are apparent in an image of the pedestrian. By way of example, visual identifiers may include vision support cane, a seeing eye dog, external hearing aids, or any similar assistance device.

The multiple alerts include audio alerts generated as described in steps 208, 210 and one of a visual alert and an olfactory alert. As with the audio alert, a model of ambient lighting or an ambient olfactory environment combined with reward/penalty alert data from the remote computing system 212 is used to generate contrasting visual alerts or olfactory alerts in a generate alternative alerts step 218 in the same general manner as the audio alert generation described in steps 208, 210.

When the disability check 214 identifies a detectable disability, and the detectable disability exceeds a minimum threshold, the process 200 generates all available types of alerts in a generate all alerts step 220 and uses the same general linear regression model generation processes (step 222) described with regard to the audio alerts. The minimum threshold in some examples is set at a level where one or more alert types may be ineffectual and as much redundancy in alerting as possible is desired.

In each case a corresponding external alert system 32, 34, 36 generates an alert discernable by pedestrians external to the vehicle 10 and contrasting the corresponding ambient levels of the alert type.

In some examples, the process 200 may include a further type of disability check after detecting a presence of a detectable disability and before generating the alert. In these examples, the type of disability check may omit alert types that would not benefit a pedestrian having the detected disability. By way of example, when the detected disability is a vision impairment or blindness, the type of disability check may cause the process 200 to omit a visual alert and rely exclusively on audio and olfactory alerts. As used herein, vision impairment includes disabilities and any other features that impair a user's vision. By way of example, vision impairment can include difficulty seeing due to biological disabilities and difficulty seeing due to obstructions such as augmented reality goggles, face screens and the like.

Similarly, when the detected disability is a hearing impairment or deafness, the type of disability check may cause the process 200 to omit an audio alert and rely exclusively on visual, olfactory, and/or tactile air alerts. As used herein, hearing impairment includes disabilities and any other features that impair a user's hearing. By way of example, hearing impairment can include difficulty hearing due to biological disabilities and difficulty hearing due to obstructions such as headphones, earplugs, earmuffs, and the like.

Figure 3:
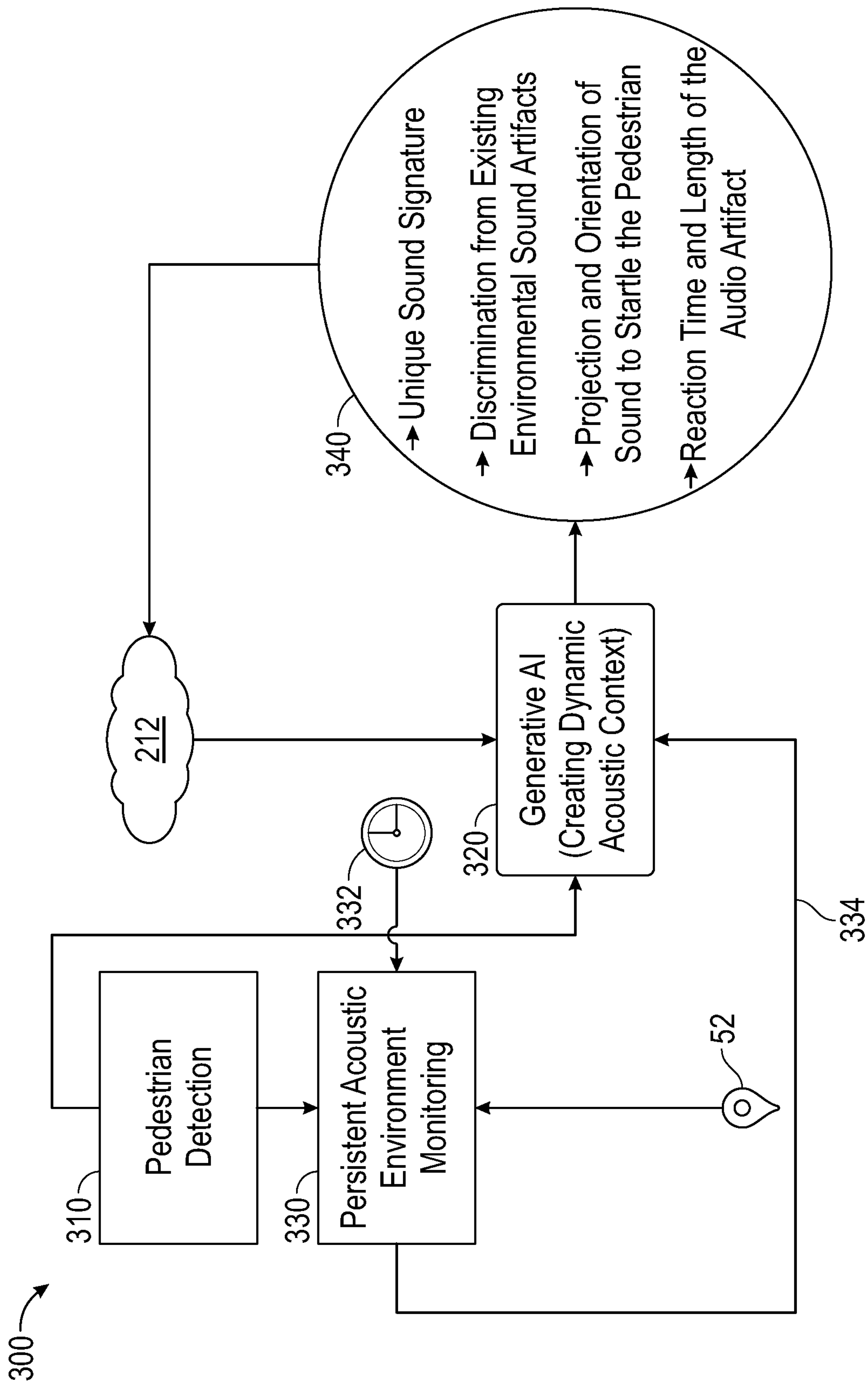
FIG. 3 illustrates a process for generating an audio alert of a vehicle presence according to one example.
Figure 4:
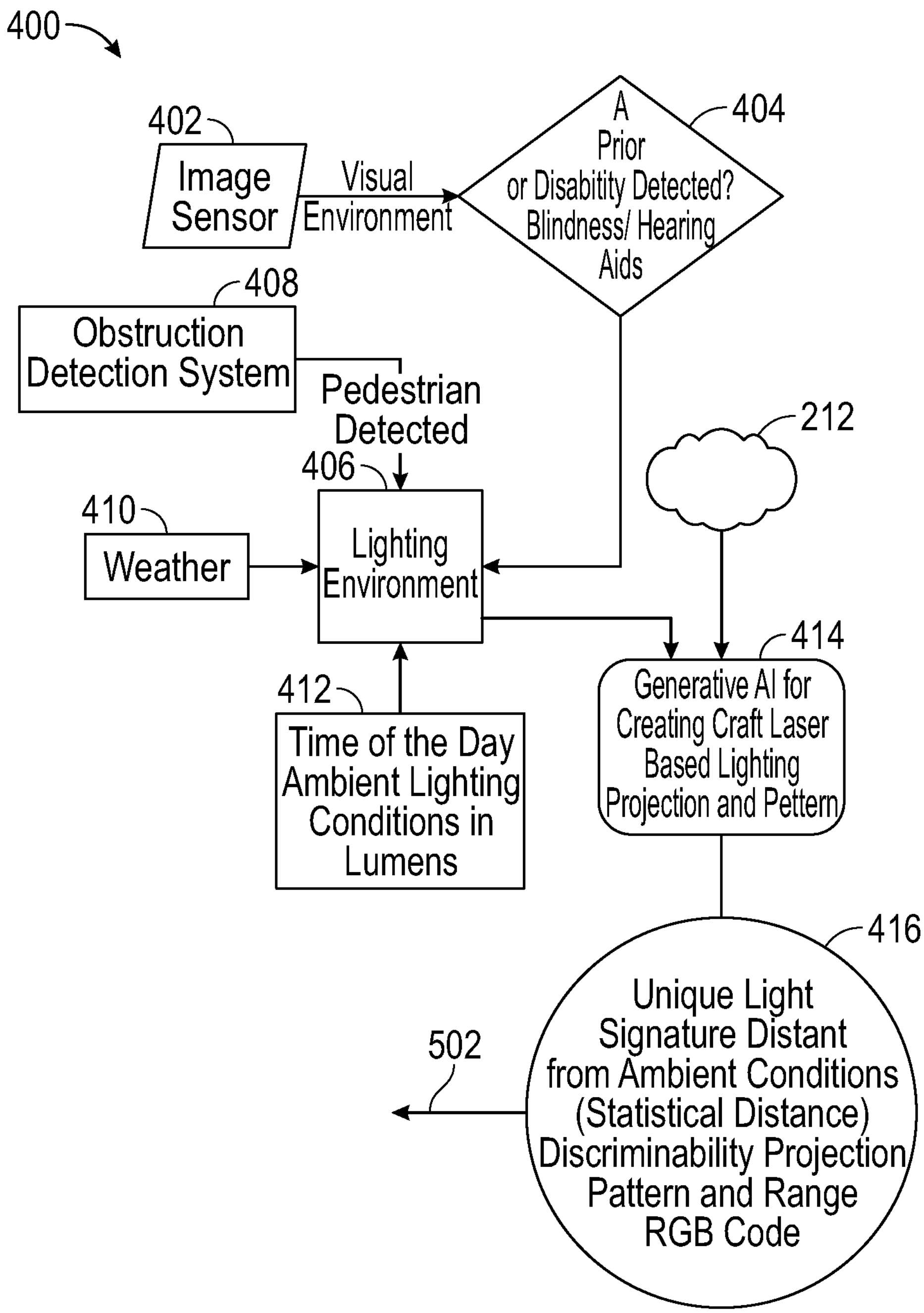
FIG. 4 illustrates a process for generating a visual alert of a vehicle according to one example.

With continued reference to FIGS. 1 and 2, FIG. 3 illustrates an exemplary audio alert generation process 300 using a generative AI model to create a contrasting audio alert. Initially, a pedestrian is detected at a pedestrian detection step 310. The pedestrian detection includes a distance from the vehicle 10 to the pedestrian and provides the distance to a generative AI model 320. Upon detection of the pedestrian, the process 300 initiates a persistent acoustic environment monitoring step 330.

The persistent audio monitoring step 330 monitors ambient audio received from the microphone 42, location data received from the GNSS 52, or from any other available location source, and a time of day 332. The persistent audio monitoring step 330 consolidates the monitored data into an output model 334 of the ambient acoustic environment and provides the output model 334 to the generative AI model 320.

The generative AI model 320 communicates with the remote computer system 212 to receive reward/penalty weights defining reward and penalty weights for the components of the output model 334 from the remote computer system 212 and generates an audio alert output 340 contrasting the ambient environment.

The contrasting audio alert 340 includes a unique sound signature that is discriminative from the existing sounds of the ambient environment. In some cases, where the vehicle 10 includes multiple and/or directional speakers 36, the audio alert 340 can be projected towards, and oriented towards, the pedestrian.

In yet further examples, the contrasting audio is configured to be sharply contrasting and emitted suddenly, thereby startling the pedestrian and drawing the attention of the pedestrian to the vehicle 10. During the audio alert 340, the reaction time of the pedestrian and a length of the audio artifacts are determined based on images from the imaging sensors 26 and audio feedback from the audio sensor 42 and provided back to the remote computer system 212. The remote computer system 212 then uses the reaction time and length of audio artifacts to refine the reward/penalty weights of the generative AI structure.

In alternate implementations, the generative AI model 320 may be replaced with a rules based model using predefined reward/penalty weights applied to a sound signal from the ambient environment monitoring information, with the rules defining specific contrasting signals and responses to potential ambient sound profiles.

Figure 5:
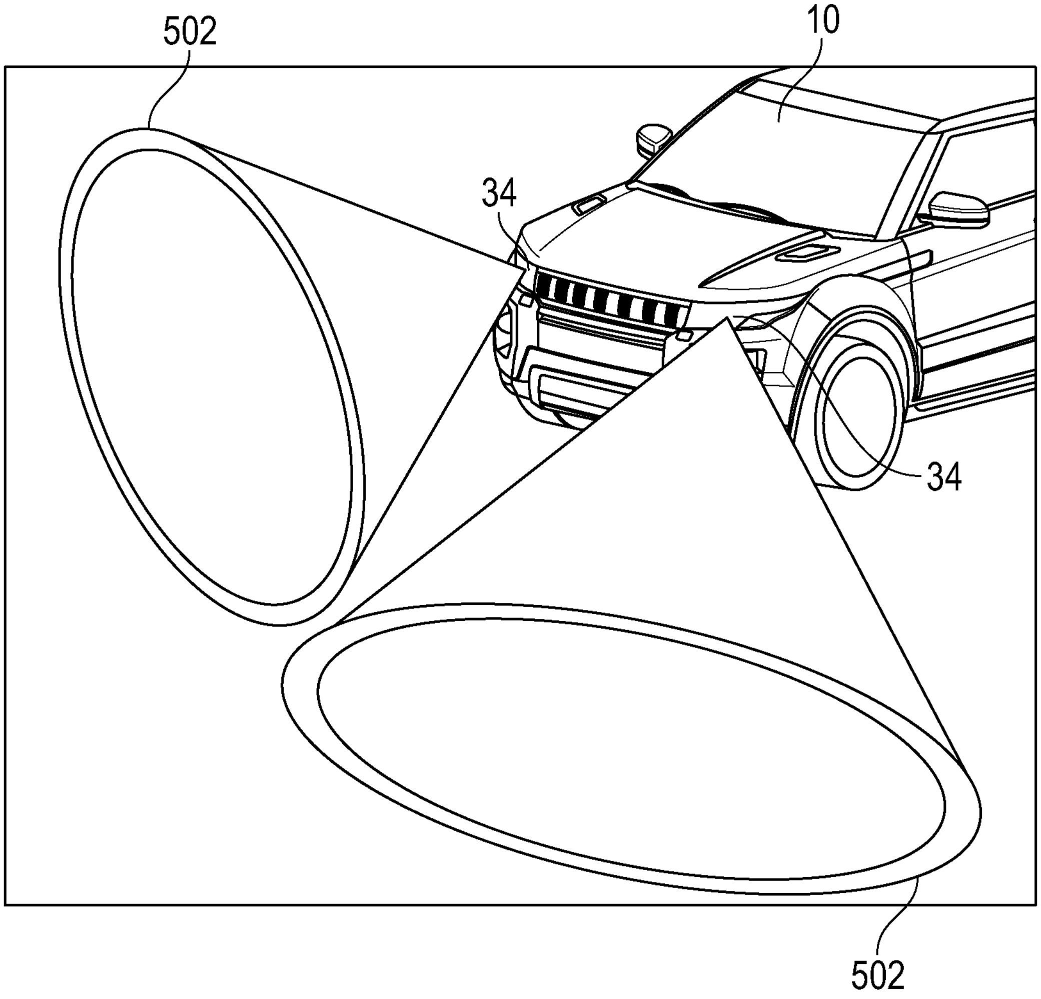
FIG. 5 illustrates an isometric view of a vehicle generating a visual alert according to one example.
Figure 6:
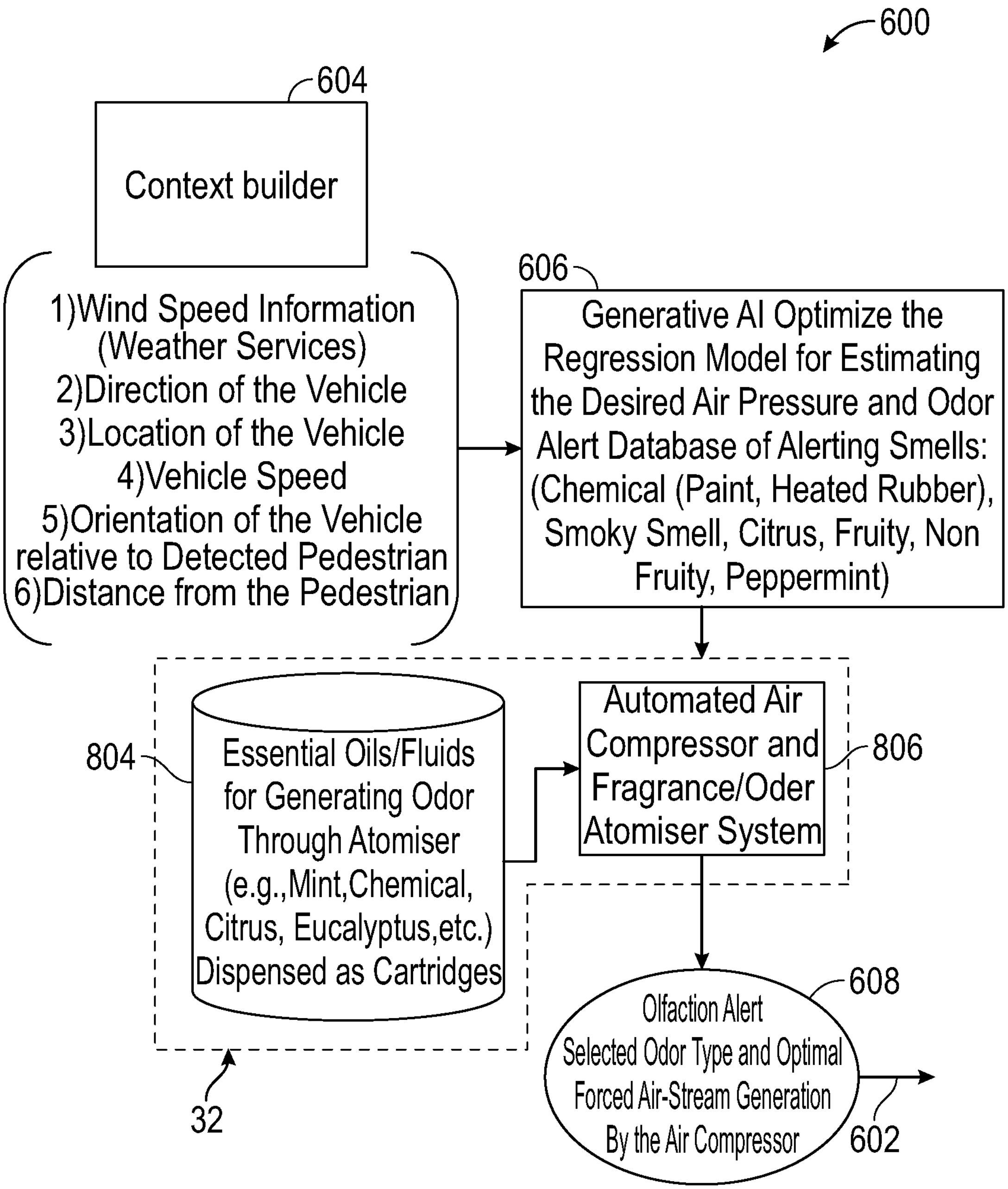
FIG. 6 illustrates a process for generating an olfactory alert of a vehicle presence according to one example.

With continued reference to FIGS. 1-3, FIG. 4 illustrates a process 400 for generating visual alerts 502 and FIG. 5 illustrates exemplary visual alerts 502 generated by the projectors 34 disposed on the vehicle 10 according to one example. Initially image sensors 26 generate images of the visual environment surrounding the vehicle 10 in an image sensor step 402. During the image sensor step 402, the images are analyzed to identify any pedestrians using existing pedestrian and/or object detection processes. As part of the visual environment, a distance between the vehicle 10 and the pedestrian is determined using the images, ranging sensors packaged on the vehicle or a combination thereof.

The detected visual environment is then provided to a disability detector 404. The disability detector 404 applies image analysis processes to the visual environment, and particularly to the identified pedestrian, and identifies any detectible disabilities that may affect the attentiveness of the pedestrian or affect the pedestrians ability to see the vehicle 10. The disability detector 404 then passes the visual environment, including the distance to the pedestrian and any detected disabilities, to a lighting environment model 406.

The lighting environment model 406 also receives inputs from a vehicle obstruction detection system 408, a weather detection system 410, and an ambient lighting 412 value. The ambient light value 412 may be from a lumens sensor on the vehicle 10, from a database correlating the time day and location of the vehicle with an expected ambient lighting condition, or a combination thereof.

In further alternatives, additional factors impacting the ambient lighting may further be provided to the lighting environment model 406 and the combination of inputs are used to construct a model of the lighting environment surrounding the vehicle 10.

Once the lighting environment model 406 is constructed, the process 400 provides the lighting environment model 406 to an alert generation module in a generate alert step 414. The generate alert step 414 uses a generative AI module to generate a contrasting visual alert 502, FIG. 5, that can be projected by the projector 34 onto the environment surrounding the vehicle 10.

The contrasting visual alert is based on the lighting environment model 406 and a saved set of reward/penalty weights from the remote computer system 212 and provides a stark contrast to the ambient lighting around the vehicle 10. In one example, laser light, or a similar system, is use to project a noticeable pattern in distinctive colors. In a further example, the noticeable pattern can include directional indicators, motion, or other features intended to draw the pedestrian's attention to the present of the vehicle 10. Once designed, the visual alert 502 is projected in a project visual alert step 416.

In one alternative example, the visual alert 502 can be generated using rules based processes that contrast range and Red Green Blue (RGB) colors of the ambient lighting, as well as rules based processes that identify clear areas near the pedestrian in which a visual alert 502 is most likely to be visible. In such a case the reward/penalty weights from the remote computer system 212 are not retrieved and the predefined rules are utilized instead.

Figure 7:
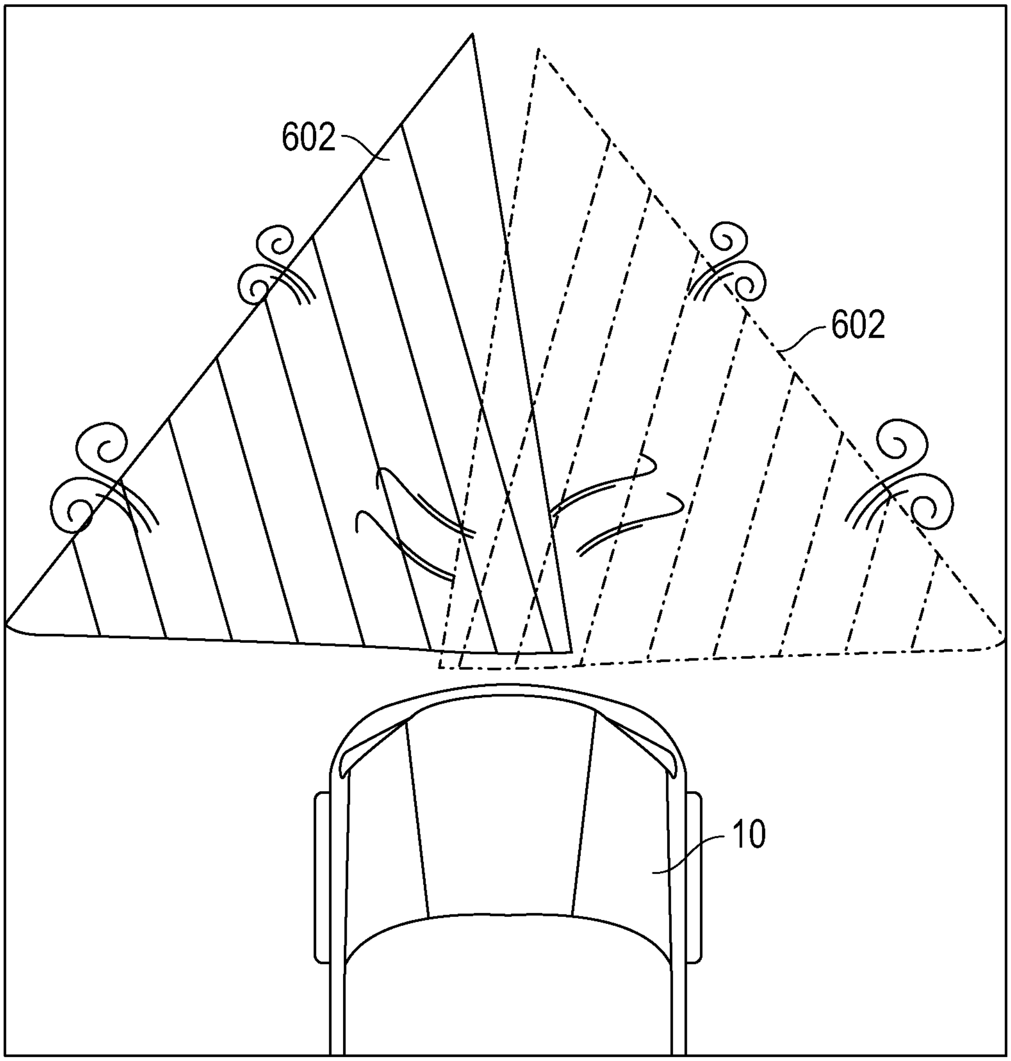
FIG. 7 illustrates a schematic view of a vehicle providing an olfactory alert according to one example.
Figure 8:
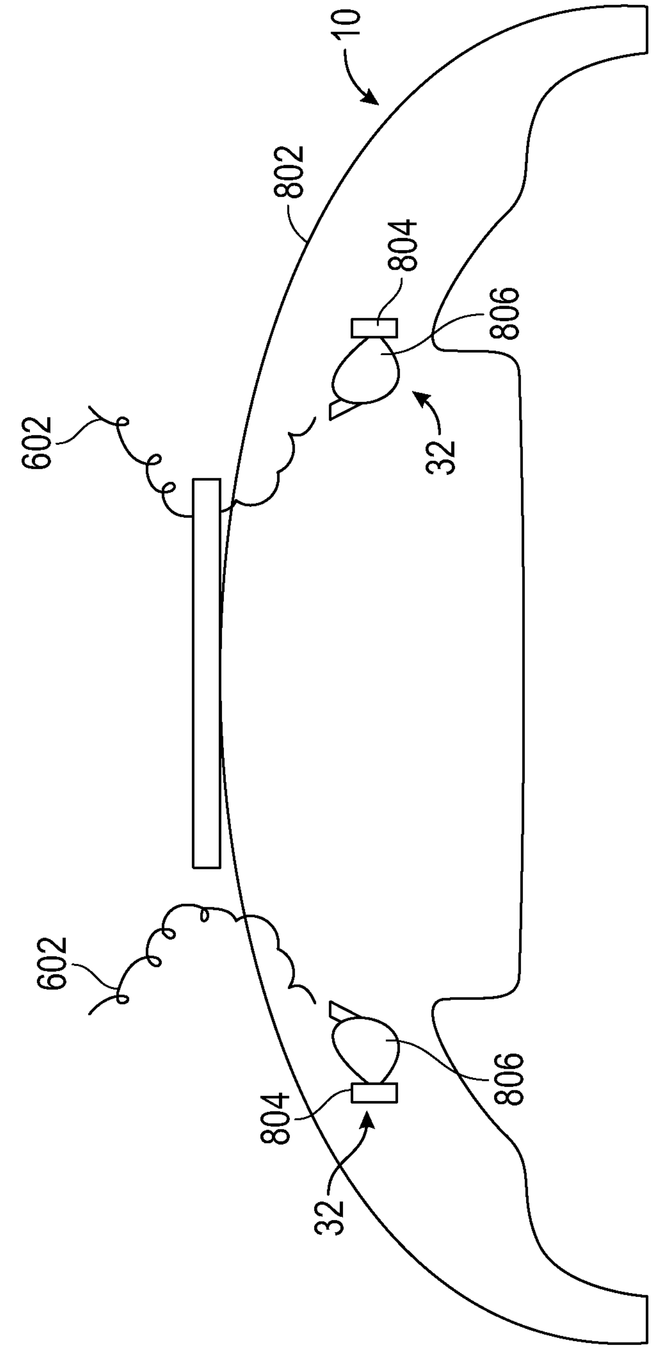
FIG. 8 illustrates a vehicle bumper structure including odor blowers according to one example.

With continued reference to FIGS. 1-5, FIG. 6 illustrates an example process 600 for generating an olfactory alert 602 (shown in FIG. 7). FIG. 7 illustrates a top down schematic view of the vehicle 10 projecting two possible olfactory alerts, and FIG. 8 illustrates blowers 32 positioned in a bumper 802 portion of a vehicle, such as a vehicle 10.

Initially the process 600 builds a contextual model of the airflows and currents in the ambient environment in a context builder step 604. In one example, the contextual model considers wind speed information provided by a weather service, a direction of travel of the vehicle 10, a location of the vehicle 10, a speed of the vehicle 10, an orientation of the vehicle 10 relative to the detected pedestrian, an ambient air pressure, and a distance from the pedestrian. The combined factors provide a general airflow of the ambient environment and are provided to a generative AI model in a generate olfactory alert step 606. In alternative examples, additional factors impacting the general airflows may be incorporated in the context builder step 604 when available to the controller 20.

The generated olfactory alert step 606 uses a generative AI model to create an optimized regression model for estimating a desired air pressure and odor alert from the blowers 32. The odor alert includes an odor selected from a database of alerting smells that are available to be produced by the blower(s) 32. By way of example, the alerting smells may include chemical smells, smokey smells, citrus smells, fruity smells, herbal smells and the like, with the particular odor being selected to contrast with the environment. In addition, the olfactory alert includes a desired air-stream orientation and pressure for alerting the pedestrian.

Once a pressure and an odor have been generated by the generative AI model in the generate olfactory alert step 606, the alert information is provided to the blower 32. In one example, the blower 32 includes a repository 804 essential oils and/or other highly scented fluids able to safely generate an odor using an atomizer and a compressor or compressed air portion 806. The olfactory blower receives the olfactory alert profile and outputs the olfactory alert 602 in an output alert step 608, see FIG. 6.

As with the audio and visual alerts, the olfactory alert may be generated using a rules based process in lieu of the generative AI model in some examples.

In some alternative examples, the blower 32 may include a tactile air current feature, able to generate an air flow such as a wind gust, oriented toward the person to be alerted. The tactile air current may be instead of or in addition to the scent features and is referred to as a tactile air alert. In such an example, the portions of the blower 32 used to generate the tactile air current are collectively referred to as an airflow generator.

In some alternative examples, a single ambient environment model may be created from a combination of sensor types and data sources. The single ambient environment model provides data necessary to generate all types of alert.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system for alerting pedestrians to a presence of a vehicle, the system comprising:

a sensing system including at least one imaging sensor in communication with a controller;

the controller including a processor and a memory, the memory storing a pedestrian detection module and a pedestrian alert module;

the pedestrian detection module including instructions configured to cause the processor to identify a pedestrian in an output of the at least one imaging sensor using image analysis;

the pedestrian alert module including instructions configured to cause the processor to respond to an identified pedestrian by determining a reduced sensory state of the pedestrian, generate an ambient environment model based on an output of the at least one imaging sensor, a weather detection system, a lumens sensor, and a connection to at least one external data source, the at least one data source including a database correlating a time of day and location of the vehicle with an expected ambient lighting condition, wherein the ambient environment model includes a model of ambient lighting conditions surrounding the vehicle;

the pedestrian alert module further including instructions configured to determine at least one alert type, based on the reduced sensory state of the pedestrian, and at least one of an initial visual data and an initial audio data, the at least one alert type including a visual alert;

the pedestrian alert module further including instructions configured to cause the processor to generate a pedestrian alert of the at least one alert type, the pedestrian alert configured to contrast with the ambient environment model, wherein the pedestrian alert includes a pattern comprising one of directional indicators and motion, and wherein the pattern contrasts the ambient lighting conditions surrounding the vehicle;

an external alert system configured to implement the pedestrian alert external to the vehicle, the external alert system including a visual alert system, and implementation of the pedestrian alert external to the vehicle comprising projecting the pattern, such that the pattern is displayed on at least one surface of the external environment.

2. The system of claim 1, wherein the external alert system includes an audio alert system;

the audio alert system including a speaker; and wherein causing the alert system to implement the pedestrian alert includes activating at least one of the audio alert system and the visual alert system.

3. The system of claim 2, wherein the audio alert system has an audio output that is adjustable in at least amplitude and frequency.

4. The system of claim 2, wherein the visual alert system has a visual output that is adjustable in at least color and brightness.

5. The system of claim 2, wherein the external alert system includes an olfactory alert system, the olfactory alert system includes a blower, and the blower has an olfactory output that is adjustable in at least scent.

6. The system of claim 2, wherein the external alert system includes a tactile air alert system and the tactile air alert system includes an airflow generator.

7. The system of claim 1, wherein determining the reduced sensory state of the pedestrian includes identifying one of a distracted state of the pedestrian and a detectable disability of the pedestrian and wherein the at least one alert type includes an audio alert in response to the pedestrian having a distracted state.

8. The system of claim 1, wherein determining the reduced sensory state of the pedestrian includes identifying one of a distracted state of the pedestrian and a detectable disability of the pedestrian and wherein the at least one alert type includes a visual alert in response to identifying a hearing impairment of the pedestrian.

9. The system of claim 1, wherein determining the reduced sensory state of the pedestrian includes identifying one of a distracted state of the pedestrian and a detectable disability of the pedestrian and wherein the at least one alert type includes an audio alert in response to identifying a vision impairment of the pedestrian.

10. The system of claim 1, wherein determining the reduced sensory state of the pedestrian includes identifying one of a distracted state of the pedestrian and a detectable disability of the pedestrian includes identifying a detectable disability having an impairment above a minimum threshold and wherein the at least one alert type omits a corresponding one of the audio alert, visual alert, olfactory alert, and the tactile air impact alert.

11. The system of claim 1, wherein the sensing system includes at least one ranging sensor and the at least one ranging sensor including at least one of a light and distance ranging (LiDAR) sensor and a radio and distance ranging (RADAR) sensor; and wherein generating the pedestrian alert is based at least in part on a range output received by the processor from the at least one ranging sensor.

12. The system of claim 1, wherein generating the pedestrian alert of the determined at least one alert type comprises providing the ambient environment model and a set of reward/weight penalties to a weighted machine learning algorithm.

13. The system of claim 12, wherein the set of reward/weight penalties are received from a remote computing system.

14. The system of claim 13, wherein the pedestrian alert module is further configured to cause the processor to isolate a response of the pedestrian to the pedestrian alert and provide the response of the pedestrian to the remote computing system.

15. The system of claim 1, wherein generating the pedestrian alert of the at least one alert type comprises applying the ambient environment model to a rules-based alert model.

16. The system of claim 1, wherein the olfactory alert system comprises an olfactory blower having a scent repository and a compressed gas portion, the scent repository storing at least one aromatic chemical.

17. The system of claim 16, wherein the scent repository stores a plurality of distinct aromatic chemicals, and wherein generating a pedestrian alert of the at least one alert type includes selecting one of a distinct aromatic chemical from the plurality of distinct aromatic chemicals and a combination of distinct aromatic chemicals from the plurality of distinct aromatic chemicals, and implementing the pedestrian alert comprises dispersing the selected one of the distinct aromatic chemical from the plurality of distinct aromatic chemicals and the combination of distinct aromatic chemicals from the plurality of distinct aromatic chemicals using compressed gas from the compressed gas portion.

18. The system of claim 1, wherein the ambient environment model includes a time of day, a weather state, an ambient sound profile, an ambient lighting profile, a speed of the vehicle, and a direction of travel of the vehicle.

19. A method for alerting a pedestrian to the presence of a vehicle, the method comprising:

receiving a set of images from a vehicle sensor system at a controller and identifying a pedestrian in the set of images using image analysis performed by the controller;

determining a reduced sensory state of the pedestrian using the controller;

receiving, at the controller, a set of ambient conditions from the vehicle sensor system and generating an ambient environment model, the vehicle sensor system including a weather detection system and a lumens sensor, and wherein generating the ambient environment model includes generating a model of ambient lighting conditions surrounding the vehicle based at least in part on at least one external data source including a database correlating a time of day and location of the vehicle with an expected ambient lighting condition;

determining at least one alert type corresponding to the reduced sensory state, wherein the at least one alert type includes a visual alert;

generating a pedestrian alert based on the at least one alert type and an ambient environment model using a pedestrian alert module, wherein the pedestrian alert contrasts an ambient environment defined by the ambient environment model, and wherein the pedestrian alert includes a pattern comprising one of directional indicators and motion, and wherein the pattern contrasts the ambient lighting conditions surrounding the vehicle; and implementing the pedestrian alert using at least one external alerting system of the vehicle by at least comprising projecting the pattern such that the pattern is displayed on at least one surface of the external environment.

20. The method of claim 19, wherein the pedestrian alert module is a weighted machine learning algorithm, and wherein a set of rewards/weight penalties for the weighted machine learning algorithm is retrieved from a remote computing system.

* * * * *